US009166716B2

(12) United States Patent
Lau

(10) Patent No.: US 9,166,716 B2
(45) Date of Patent: Oct. 20, 2015

(54) AUTOMATIC ROLLOVER TO STREAMED RADIO

(75) Inventor: Dannie C. Lau, Santa Clara, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 533 days.

(21) Appl. No.: 13/458,878

(22) Filed: Apr. 27, 2012
(Under 37 CFR 1.47)

(65) Prior Publication Data

US 2012/0290738 A1 Nov. 15, 2012

Related U.S. Application Data

(60) Provisional application No. 61/480,002, filed on Apr. 28, 2011.

(51) Int. Cl.
*G06F 15/16* (2006.01)
*H04H 60/82* (2008.01)
*H04L 29/06* (2006.01)

(52) U.S. Cl.
CPC ......... *H04H 60/82* (2013.01); *H04L 29/06448* (2013.01)

(58) Field of Classification Search
CPC ........................................................ H04L 1/00
See application file for complete search history.

(56) References Cited

U.S. PATENT DOCUMENTS

| | | | | |
|---|---|---|---|---|
| 2004/0068458 | A1* | 4/2004 | Russo | 705/36 |
| 2006/0206582 | A1* | 9/2006 | Finn | 709/217 |
| 2007/0022207 | A1* | 1/2007 | Millington | 709/231 |
| 2007/0124426 | A1* | 5/2007 | Proidl | 709/218 |
| 2009/0055195 | A1* | 2/2009 | Karlsgodt | 704/500 |
| 2012/0129475 | A1* | 5/2012 | Mere | 455/179.1 |
| 2012/0129476 | A1* | 5/2012 | Whikehart et al. | 455/179.1 |

* cited by examiner

*Primary Examiner* — Kristie Shingles
*Assistant Examiner* — Keyvan Emdadi
(74) *Attorney, Agent, or Firm* — Brooks Kushman, P.C.

(57) ABSTRACT

In view of the above, a radio player is provided. In an example implementation, the radio player includes a radio signal receiver configured to receive a radio broadcast corresponding to a tuner setting on a tuner. The radio signal receiver is configured to retrieve an air radio program from the radio broadcast corresponding to a radio station identified by the tuner setting. A digital stream radio receiver is connected to a data network. The digital stream radio receiver is configured to establish a data connection with a radio station identified by a radio station network identifier to receive a streamed radio program. A source selector selects between either the air radio program or the streamed radio program to play at an audio output when the air radio program and the streamed radio program are broadcast from the same radio station.

19 Claims, 3 Drawing Sheets

AUTOMATIC ROLLOVER TO STREAMED RADIO

RELATED APPLICATIONS

This application claims priority of U.S. Provisional Patent Application Ser. No. 61/480,002, filed Apr. 28, 2011, which is incorporated by reference herein.

BACKGROUND

1. Field of the Invention

The present invention relates to radio receivers, and more particularly to radio receivers that receive radio signals streamed over data networks.

2. Related Art

Radio programming has long been available only via radio signals broadcast through the air to antennas on radio receivers. The radio programming is broadcast by transmitters at fixed locations and received by receivers close enough to receive the signals. The quality of the signal reception depends on many factors. One is the power of the radio transmitters. Other factors include the sensitivity and other performance capabilities of the radio's antenna, atmospheric conditions, geographic and man-made obstructions, and many other factors. In general, the quality of the signal received varies throughout the area served by the radio transmitters.

Data network connectivity has grown in bandwidth, capability, and accessibility such that radio programming is now available as data streams over the Internet. Radio programmers may now offer both on-air broadcasts as well as digitally streamed broadcasts. Users of personal computers, smartphones, MP3 players, handheld media players (such as the iPod), and other computer-controlled devices with the ability to connect to the Internet may connect to streamed broadcasts of radio programming. The sound quality of the digitally streamed broadcasts may also be consistently better than the quality of over-the-air broadcasts.

Radio listeners now have the option of receiving radio programming over the Internet, or over the air. However, each requires a different type of receiver. Over the air reception requires a traditional radio receiver with an antenna. Digital streaming reception requires a computer platform configured to operate according to the data packet-based communication protocols used over the Internet.

There is a need for radio receivers capable of receiving both over-the-air radio programming at an antenna as well as digitally streamed radio programming over a data packet network. There is also a need for a radio receiver having a user interface that does not require a user to distinguish between different radio signal sources.

SUMMARY

In view of the above, a radio player is provided. In an example implementation, the radio player includes a radio signal receiver configured to receive a radio broadcast corresponding to a tuner setting on a tuner. The radio signal receiver is configured to retrieve an air radio program from the radio broadcast corresponding to a radio station identified by the tuner setting. A digital stream radio receiver is connected to a data network. The digital stream radio receiver is configured to establish a data connection with a radio station identified by a radio station network identifier to receive a streamed radio program. A source selector selects between either the air radio program or the streamed radio program to play at an audio output when the air radio program and the streamed radio program are broadcast from the same radio station.

In another example, a method is provided for playing radio programming from a radio station. A user selected station identifies the radio station broadcasting the desired radio programming. The user selected station is checked to determine if it identifies a streamed radio station. If the user selected station identifies the selected radio station as being a streamed radio station, a data network connection is established with the radio station. A radio receiver is tuned to a radio frequency corresponding to the user selected station when the selected radio station is not a streamed radio station.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The description below may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
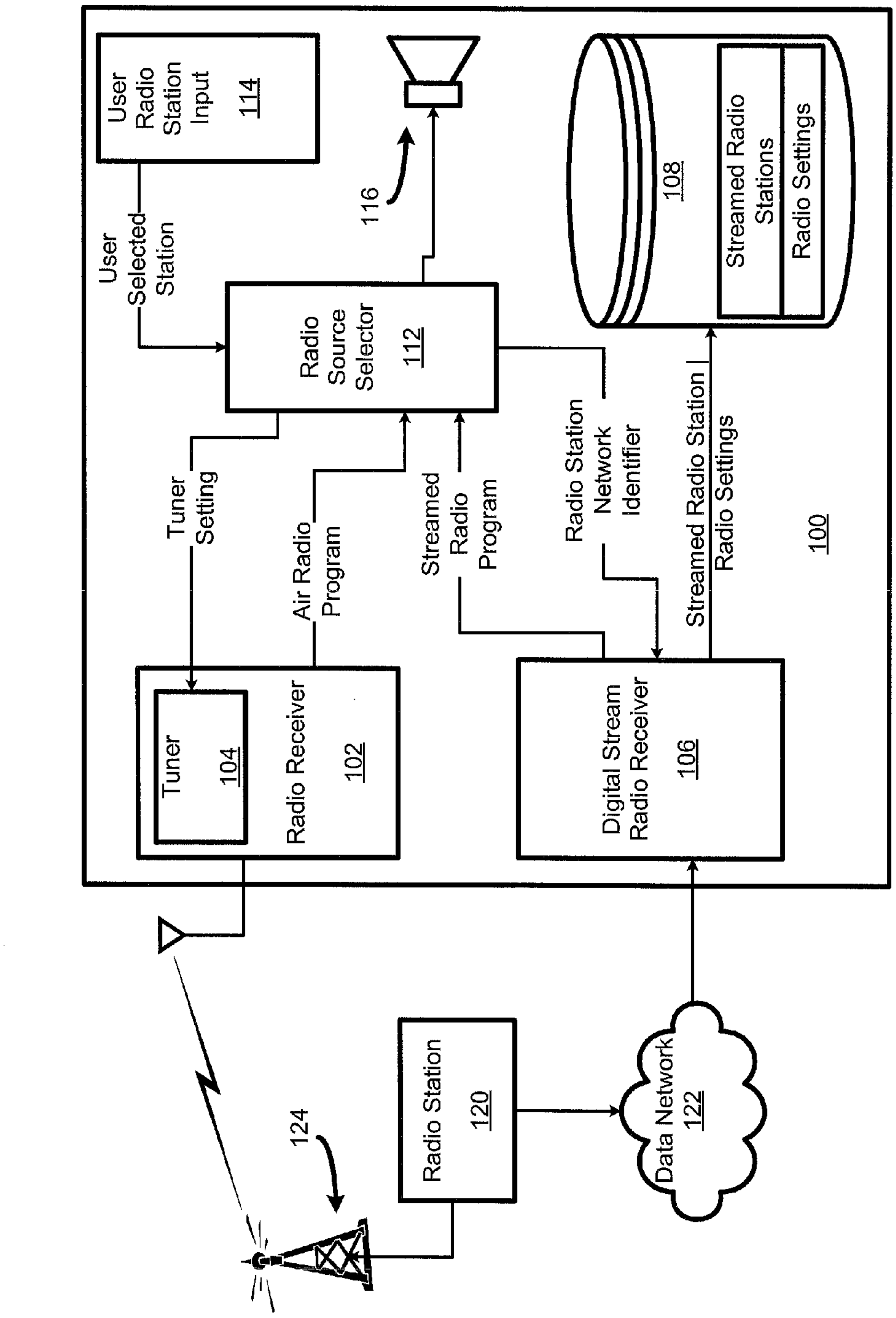
FIG. 1 is a block diagram of an example of a radio receiver configured to receive radio signals from over-the-air broadcasts and from a data network.

It is to be understood that the following description of examples is given only for the purpose of illustration and is not to be read as limiting. The partitioning of examples in functional blocks or units shown in the drawings is not to be construed as indicating that these units necessarily are implemented as physically separate units, but functional block or units shown or described may be implemented as separate units, circuits, chips or circuit elements, but one or more functional blocks or units may as well be implemented in a common circuit, chip, circuit element or unit.

FIG. 1 is a block diagram of an example of a radio player 100 configured to receive radio signals from over-the-air broadcasts and from a data network. A radio station 120 generates a radio broadcast containing radio programming for communication to its listeners. The radio station 120 communicates the radio programming to a radio transmitter 124 for over-the-air broadcast, to a data network 122 for transmission by digital streaming, or both. The radio player 100 may receive an over-the-air broadcast at an antenna connected to a radio receiver 102. The radio player 100 may also receive the digital streamed communication at a digital stream radio receiver 106. A radio source selector 112 selects whether the radio programming is to be played using an air radio program from the radio signal receiver 102 or a streamed radio program from the digital stream radio receiver 104.

The radio player 100 includes a user radio station input 114 to allow the user to select a radio broadcast. The radio player 100 also includes a radio station database 108 for storing a list of radio stations that are available as streamed radio programming over the data network 122.

Over-the-air radio programming has long been available and remains widely used on both the AM or FM radio bands. Digital streamed broadcasting of radio programs has evolved more recently. Radio stations that have broadcasted radio programming over the air are increasingly streaming their radio programming over the Internet. Air broadcast radio programs and streamed radio programs are received and played by different types of receivers. The radio player 100 in FIG. 1 includes receivers for both modulated air broadcast radio signals and Internet broadcast radio data streams.

The radio signal receiver 102 includes an antenna and a tuner 104. The radio signal receiver 102 receives radio signals from the radio transmitter 124 and demodulates the signal to obtain the baseband signal containing the radio program. The tuner 104 selects the radio frequency used to carry the radio signal. The radio frequency is typically an FM or an AM signal, but any frequency band may be used. The radio frequency may be correlated with the user selected station at the user radio station input 114. For example, a radio pre-set list may be implemented as selectors (for example, on a computer screen as buttons) similar to radio pre-sets used in radios in automobiles.

The digital stream radio receiver 106 includes a data network interface configured for communication with the data network 122. Streamed radio is broadcast over the Internet, which provides substantially world-wide data network connectivity. The data network 122 shown in FIG. 1 is to be understood to include the Internet and any other data network that uses any data network infrastructure to access and communicate over the Internet. For example, communication over the Internet involves implementing communication protocols that specify how data is organized in the digital signals communicated over the network, and how the digital signals are communicated. The digital stream radio receiver 106 in FIG. 1 may be connected to any infrastructure that operates data networks capable of communicating over the Internet. While the Internet is described below, it is to be understood by those of ordinary skill in the art that any data network having similar capabilities relating to streaming radio may be used as well.

The digital stream radio receiver 106 receives data representing streamed radio signals from a server, or other suitable network device, configured by the radio station 120 to broadcast the streamed radio programming. The streamed program may be accessed by sending data network requests to the data network server operated by the selected radio station 120. The data network requests may conform to any suitable protocol and communication scheme implemented for accessing the streamed radio programming. In one example, the radio station 120 may operate a web-site accessible over the World-Wide Web ("Web"). The web-site may include a link presented as a "button" or other graphical image that creates a data connection for transporting the streamed radio programming over the data network to the radio player 100.

The radio station 120 may implement any suitable data network infrastructure for accessing and transporting the streamed radio programming. The streamed radio programming may be selected from among multiple radio stations that provide streamed radio programming using an identifier typically provided in the data network request for the programming Over the Internet, data network connections are typically made using the TCP/IP protocol. The network devices that connect the radio player 100 and the radio station 120 server are addressable by their IP ("Internet Protocol") addresses. The web-site for the radio station 120 may be accessed over the Web using an URL ("Universal Resource Locator").

The digital stream radio receiver 106 receives a radio station network identifier from a radio source selector 112. The radio station network identifier corresponds to the radio broadcast corresponding to the radio station that the user selects for listening. The digital stream radio receiver 106 communicates the radio station network identifier to the digital stream radio receiver 106, and a tuner setting to the tuner 104 of the radio signal receiver 102. The radio source selector 112 determines whether to play the digital streamed radio program or the air radio program when both are available. If the user selects a radio station that only broadcasts its radio programming over the air, then only the air radio program is available to play. The listener may also be traveling with the radio player 100 or be in a location that is too remote to receive the air radio program broadcast by the desired radio station, but may be able to connect over the Internet to receive the radio station's streamed radio program. If both the air radio program and the streamed radio program broadcast by a radio station are available, the radio source selector 106 may select one or the other. In one example implementation, the radio source selector 106 selects the streamed radio program over the air radio program. The streamed radio program typically provides higher quality reception than the air radio program that is less susceptible to environmental effects on the reception. The radio source selector 112 couples the selected program to an audio output 116.

The radio source selector 112 receives data indicative of a user selected radio station from a user radio station input 114. A traditional radio typically includes a tuner implemented as a knob, or 'up' and 'down' buttons to scan the selected frequency band (AM or FM). The radio source selector 112 may implement the same type of user control device. However, instead of actually scanning the frequency bands as in a traditional radio, the user's selected radio station is communicated to the radio source selector 112, which selects whether to play from the air radio program or the streamed radio program. The user radio station input 114 may include a list of radio stations either selected by the user as being "favorites," or provided as radio stations available according to geographical location, programming type (such as talk radio, sports radio, rock, news, public radio, etc.), or a combination thereof. The user selected station may include the radio station's call letters and radio frequency. The frequency band may also be included (that is, AM or FM).

The radio source selector 112 may provide the radio station selected by the user at the user radio station input 114 to the digital stream radio receiver 106 as a corresponding radio station network identifier. The digital stream radio receiver 106 may obtain a data network address (URL, IP address, or other suitable addressing identifier) from a radio station database 108. The radio station database 108 may include an identifier, such as the call letters for the radio station (for example, WXRT), the frequency and geographical location, or other suitable identifier, and the data network address that may be used in a data request for a connection to the radio station 120. If the listener selects a radio station that is not in the radio station database 108, the digital stream radio receiver 106 may perform a network search for the radio station's digital stream source. Once the radio station's digital stream source is found, the streamed radio station identifier and data network address may be stored in the radio station database 108.

If a streamed radio station is not in the radio station database 108, and if the search for the streamed radio station does not yield the desired source, the radio source selector 112 selects to receive the radio programming from the radio signal receiver 102. The radio source selector 112 provides a tuner setting, which may be a frequency setting in and a frequency band identifier in the format understood by the tuner 104 in the radio signal receiver 102. The tuner 104 tunes the radio signal receiver 102 to the desired station and the air radio program is connected via the radio source selector 112 to the audio output 116.

It is noted that FIG. 1 illustrates one example implementation of the radio player 100. The radio player 100 may be an apparatus similar to well known radios and audio receivers with antennas and tuners for AM and FM reception, but with the digital stream radio receiver 106 and the necessary data network interface hardware and computing hardware included. The radio player 100 may also be implemented on a computer, or on a mobile device such as a media player (iPod™, MP3 devices, etc.), a smartphone, a handheld computer (Palm™ handhelds), a tablet (iPad™), or on any suitable computer device with a radio signal receiver 102 included. The radio player 100 also includes software configured to perform software functions.

Figure 2:
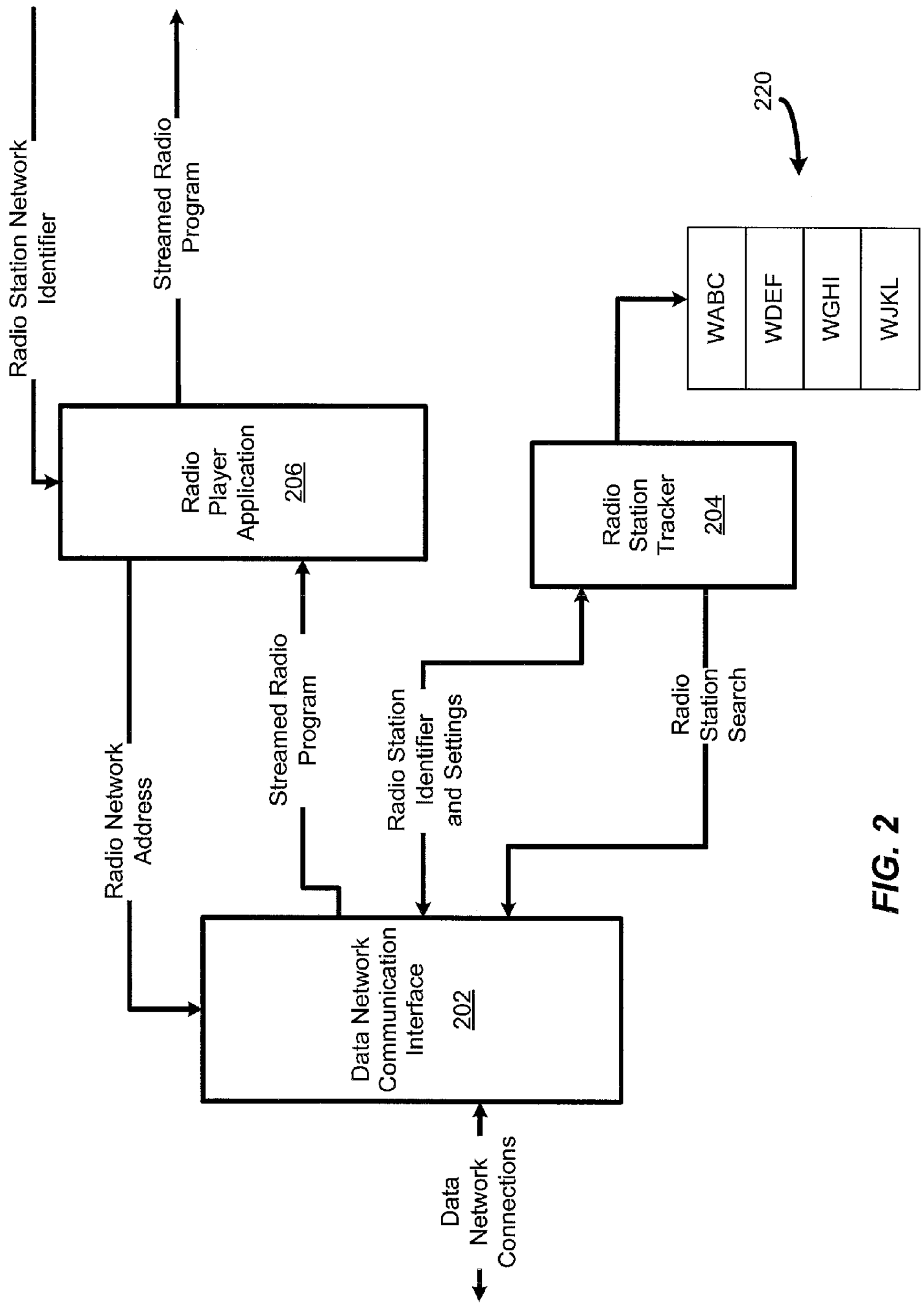
FIG. 2 is a block diagram of an example of a digital streamed radio receiver.

FIG. 2 is a block diagram of an example of a digital streamed radio receiver 106. The digital streamed radio receiver 106 in FIG. 2 includes a data network communication interface 202, a radio station tracker 204, a radio player application 206, and access to a radio station database 220. The data network communication interface 202 interfaces with the data network 122 (in FIG. 1) implementing the Internet protocols for communicating the data network requests and digital streamed media. The data network communication interface 202 may receive a radio network address to provide an identifier identifying the radio station in the data network request. The radio station network address may be communicated to the radio station tracker 204, which looks up the radio station in the radio station database at 220. If the radio station database includes the information for connecting to the radio station over the data network 122, the information is accessed by the data network communication interface 202 and the data request for connection to the radio station is communicated. If the radio station database does not contain the information relating to the selected radio station, a radio station search request may be communicated to the data network communication interface 202. The radio station search request may include data for initiating a search using a search engine (such as Google® or Yahoo!®). The data network communication interface 202 may include parsing functions, or other functions for identifying links to the desired streaming radio source. The radio station identifier and connection settings may then be stored in the radio station database at 220 for future reference.

A radio player application 206 may be provided to interface between the user and the data network communication interface 202. The radio player application 206 may receive a radio station identifier from the user, which may be via the radio source selector 112 (FIG. 1). The radio application 206 receives the streamed radio program from the data network communication interface 202 and communicates the program to the audio output 116, which may be via the radio source selector 112 (FIG. 1).

Figure 3:
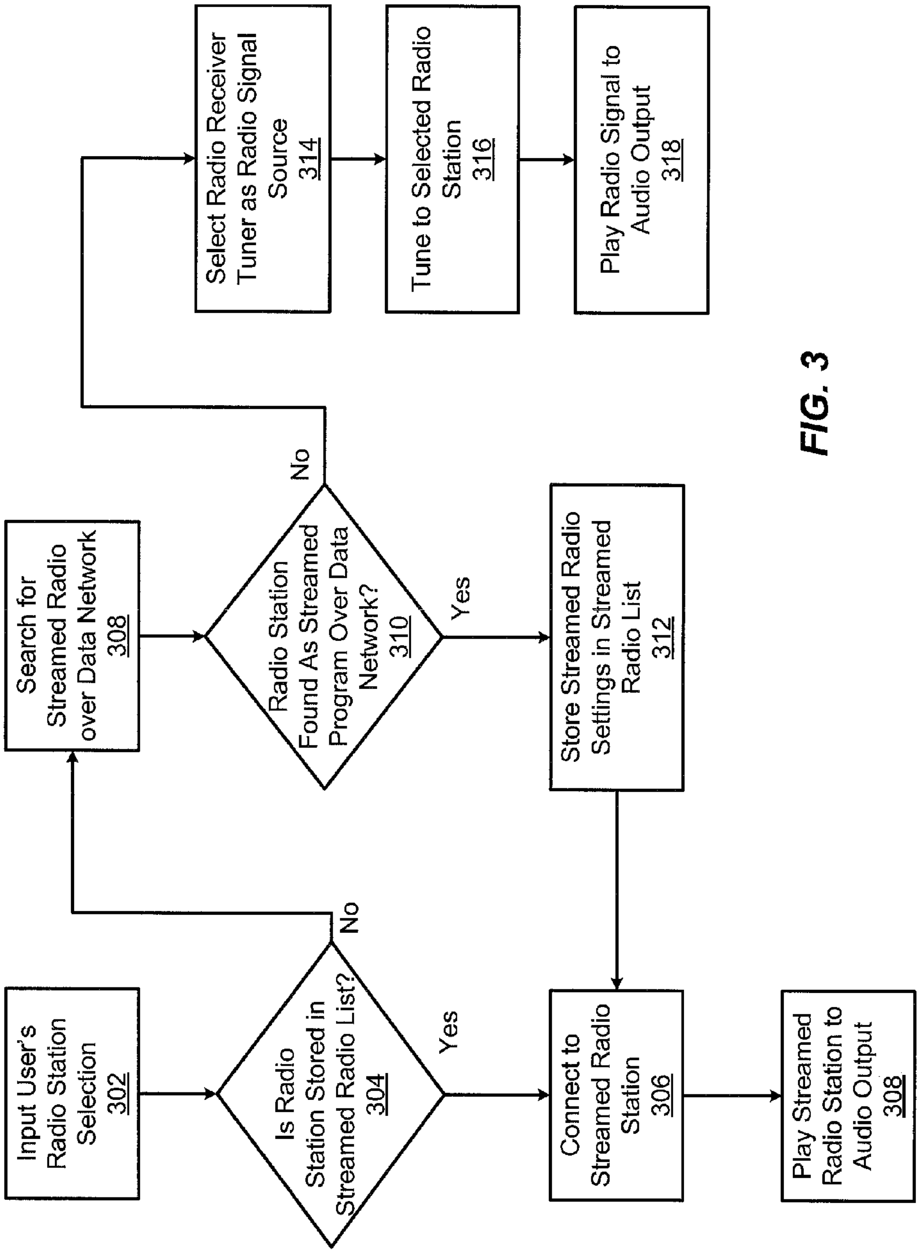
FIG. 3 is a flow chart of an example of a radio rollover method for use in the radio receiver in FIG. 1.

FIG. 3 is a flow chart of an example of a radio rollover method 300, which may be implemented in the radio player 100 in FIG. 1. The listener may select a radio station at step 302. The listener selection may be made by any suitable user input device. The selected radio station is searched in the radio station database 108 (FIG. 1) at decision block 304. If the selected radio station is found in the radio station database 108, the radio settings are retrieved and used to connect to the streamed radio station at step 306. The streamed radio station programming is the played at the audio output at step 308.

If the radio station was not found in the radio station database 108 at decision block 304, the radio station may be searched over the data network at step 308. The search for a radio station may include generating a request to connect to a search engine with parameters that identify the radio station (for example, the call letters, geographic location of the station, frequency, etc.). The search engine may return the search results as a list of 'hits' that may be parsed or analyzed for a link to the selected radio station. Other searching techniques may be used as well.

At decision block 310, the search results are checked to determine if a source for digital streamed radio programming from the selected radio station was found. If the desired source was found, information identifying the radio station and any desired settings may be stored in the radio stations database 108 (FIG. 1) at step 312. If a source for digital streamed radio programming from the selected radio station is not found at decision block 310, the air radio program is selected at step 314. The tuner 104 (FIG. 1) is set to the selected radio station at step 316. The radio signal carrying the air radio program is played at the audio output at step 318.

It will be understood, and is appreciated by persons skilled in the art, that one or more processes, sub-processes, or process steps described in connection with FIGS. 1-3 may be performed by hardware and/or software. If the process is performed by software, the software may reside in software memory (not shown) in a suitable electronic processing component or system such as, one or more of the functional components or modules schematically depicted in FIGS. 1-3. The software in software memory may include an ordered listing of executable instructions for implementing logical functions (that is, "logic" that may be implemented either in digital form such as digital circuitry or source code), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store or communicate the program for use by or in connection with the instruction execution system, apparatus, or device. The computer readable medium may selectively be, for example, but is not limited to, an electronic, magnetic, optical, electromagnetic, infrared, or semiconductor system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A radio player comprising:

a radio signal receiver configured to receive a radio broadcast corresponding to a tuner setting on a tuner, and to retrieve an air radio program from the radio broadcast corresponding to a radio station identified by the tuner setting;

a digital stream radio receiver connected to a data network, the digital stream radio receiver configured to establish a data connection with a radio station identified by a radio station network identifier to receive a streamed radio program; and a radio source selector configured to select the streamed radio program over the air radio program to play at an audio output when the air radio program and the streamed radio program are broadcast from the same radio station.

2. The radio player of claim 1 further comprising a radio station database configured to store streaming radio station identifiers and corresponding data network addresses.

3. The radio player of claim 2 where the radio station database includes call letters of radio stations as radio station network identifiers.

4. The radio player of claim 1 where the digital stream receiver is configured to receive a radio station network identifier from the source selector and to search for a digital stream source of the radio station identified by the radio station network identifier.

5. The radio player of claim 1 further comprising a user radio station input configured to permit a user to select a radio station to play.

6. The radio player of claim 5 further comprising:

a radio station database configured to store streaming radio station identifiers and corresponding data network addresses;

where the user radio station input provides a user selected station to the radio source selector, the radio source selector being further configured to search the radio station database for a streaming radio station identifier that corresponds to the user selected station.

7. The radio player of claim 6 where the radio source selector provides the tuner setting corresponding to the user selected station to the radio receiver to access the air radio program corresponding to the user selected station when a streaming radio station identifier corresponding to the user selected station is not located in the radio station database.

8. The radio player of claim 7 where the digital stream radio receiver receives the radio station network identifier corresponding to the user selected station and initiates a network search of a digital stream source corresponding to the radio station network identifier when the streaming radio station identifier corresponding to the user selected station is not located in the radio station database.

9. The radio player of claim 1 where the digital streamed radio receiver further comprises:

a radio player application operating on a computing device as a software application; where the computing device further includes an interface to the radio signal receiver.

10. The radio player of claim 1 implemented in a mobile apparatus including all hardware and software components to perform air radio broadcast reception and digital streamed radio reception.

11. A method comprising:

determining if a user selected station indicates a radio station broadcasting a streamed radio program corresponding to an air radio program;

establishing a data network connection with the radio station when the user selected station is identified as broadcasting the corresponding streamed radio program; and tuning a radio receiver to an air radio frequency of the radio station when the user selected station is not identified as broadcasting the corresponding streamed radio program.

12. The method of claim 11 where the step of determining if the user selected station indicates a radio station broadcasting a corresponding streamed radio station includes:

querying a radio station database based on the user selected station.

13. The method of claim 12 further comprising:

searching for a digital stream source corresponding to the user selected station when the user selected station is not found in the radio station database.

14. The method of claim 13 further comprising:

adding a radio station network identifier and a data network address corresponding to the digital stream source of the user selected station to the radio station database when the digital stream source is found.

15. The method of claim 13 further comprising:

formulating a search query according to a search engine.

16. The method of claim 13 further comprising:

parsing search results to identify links to the digital streaming radio source.

17. The method of claim 12 further comprising:

retrieving a data network address corresponding to a radio station network identifier for the user selected station; where the step of establishing the data network connection includes using the data network address.

18. The method of claim 11 further comprising:

responding to a user input selecting desired radio programming; and generating the user selected station as a set of call letters for the radio station selected and radio frequency corresponding to the desired radio programming.

19. The method of claim 18 further comprising:

providing a list of radio stations for user selection based on criteria selected from one or a combination of: a user favorite, geographic location, programming type.

* * * * *